(12) United States Patent
Ozawa

(10) Patent No.: US 9,400,948 B2
(45) Date of Patent: Jul. 26, 2016

(54) IMAGE PROCESSING FOR RENDERING AN INDEXED COLOR IMAGE

(71) Applicant: CANON KABUSHIKI KAISHA, Tokyo (JP)

(72) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/091,136

(22) Filed: Nov. 26, 2013

(65) Prior Publication Data

US 2014/0153055 A1 Jun. 5, 2014

(30) Foreign Application Priority Data

Dec. 4, 2012 (JP) ................... 2012-265269

(51) Int. Cl.
- G06K 15/02 (2006.01)
- G06T 11/60 (2006.01)
- H04N 1/405 (2006.01)
- H04N 1/64 (2006.01)

(52) U.S. Cl.
CPC ............ *G06K 15/1881* (2013.01); *G06T 11/60* (2013.01); *H04N 1/4051* (2013.01); *H04N 1/644* (2013.01); *G06K 15/1807* (2013.01); *G06K 2215/0094* (2013.01)

(58) Field of Classification Search
USPC .......................................... 358/1.9, 2.1, 3.06
See application file for complete search history.

(56) References Cited

U.S. PATENT DOCUMENTS

| | | | |
|---|---|---|---|
| 6,262,806 B1* | 7/2001 | Hughes ................. | G06F 3/1212 358/1.14 |
| 2002/0067509 A1* | 6/2002 | Roylance ........................ | 358/2.1 |
| 2006/0028664 A1* | 2/2006 | Ono ............................... | 358/1.9 |
| 2007/0297667 A1* | 12/2007 | Umezawa ...................... | 382/162 |
| 2010/0238467 A1* | 9/2010 | Shiraishi ................ | G03G 15/01 358/1.9 |

FOREIGN PATENT DOCUMENTS

JP 2004-25572 A 1/2004

\* cited by examiner

*Primary Examiner* — Barbara Reinier
(74) *Attorney, Agent, or Firm* — Canon USA Inc. IP Division

(57) ABSTRACT

An image processing method includes receiving image data including a color lookup table, and rendering the image data without referring to the color lookup table for each pixel when a combination of color values defined in the color lookup table is a predetermined combination.

26 Claims, 16 Drawing Sheets

FIG.3
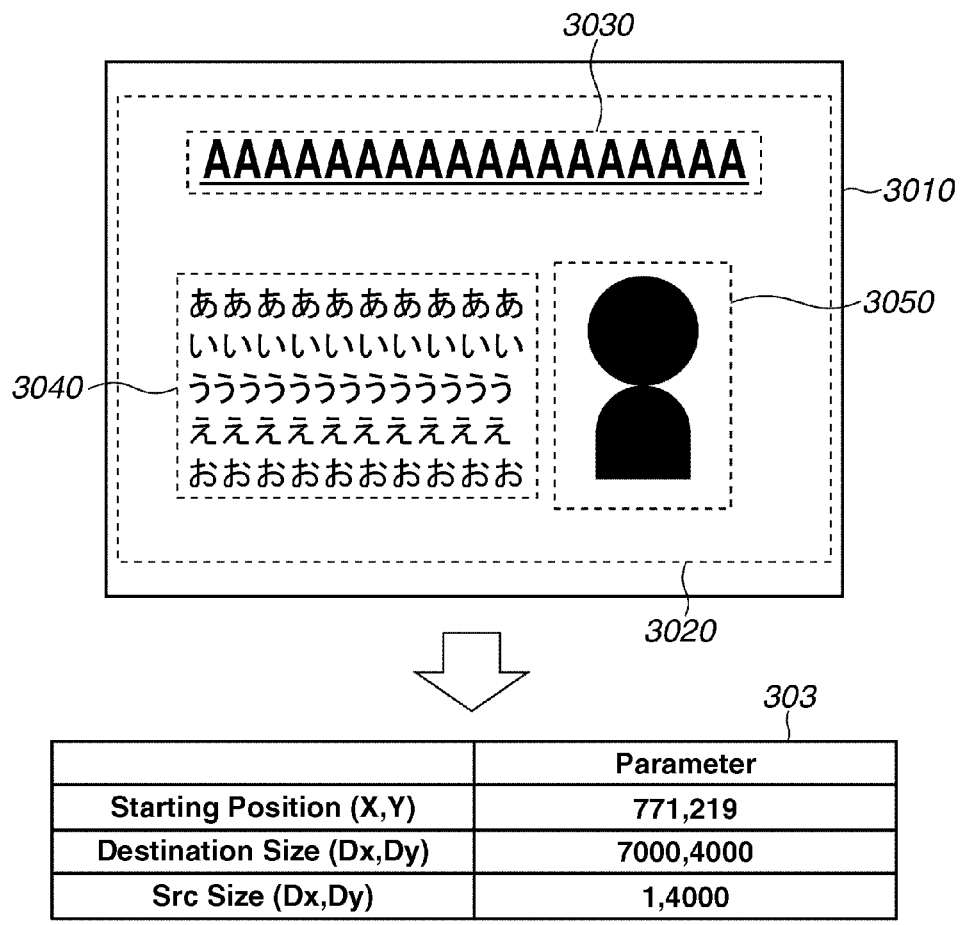
| | Parameter |
|---|---|
| Starting Position (X,Y) | 771,219 |
| Destination Size (Dx,Dy) | 7000,4000 |
| Src Size (Dx,Dy) | 1,4000 |
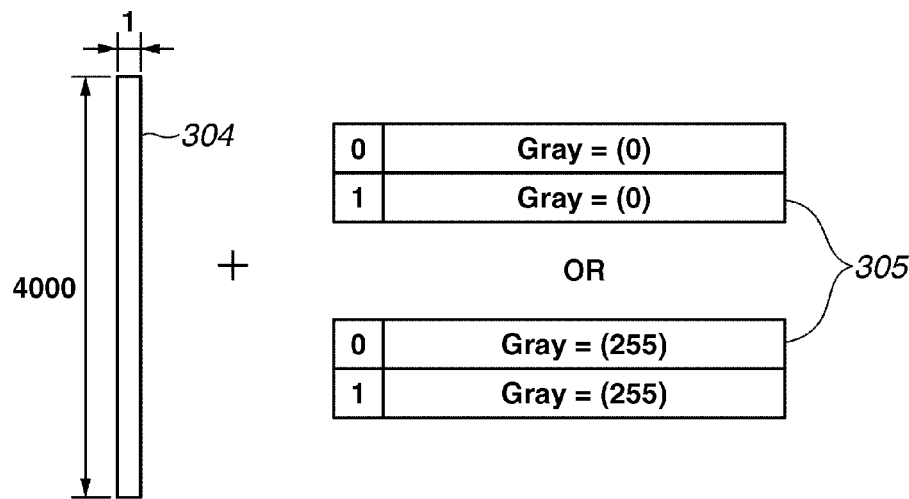

FIG.4
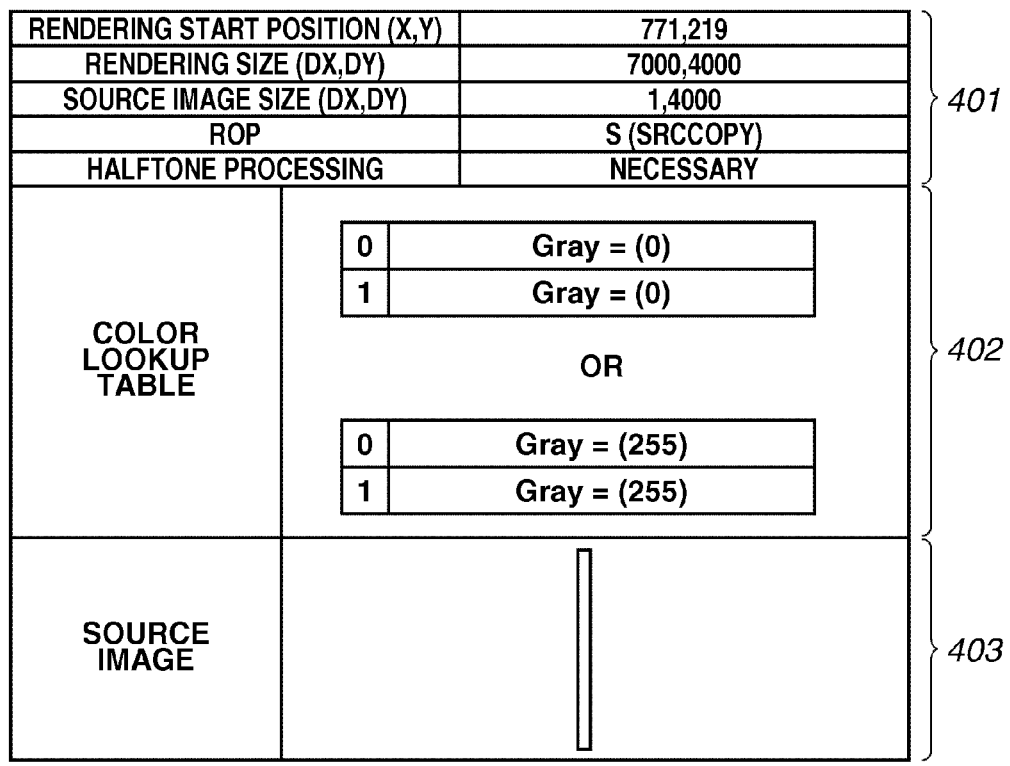
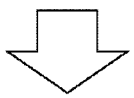
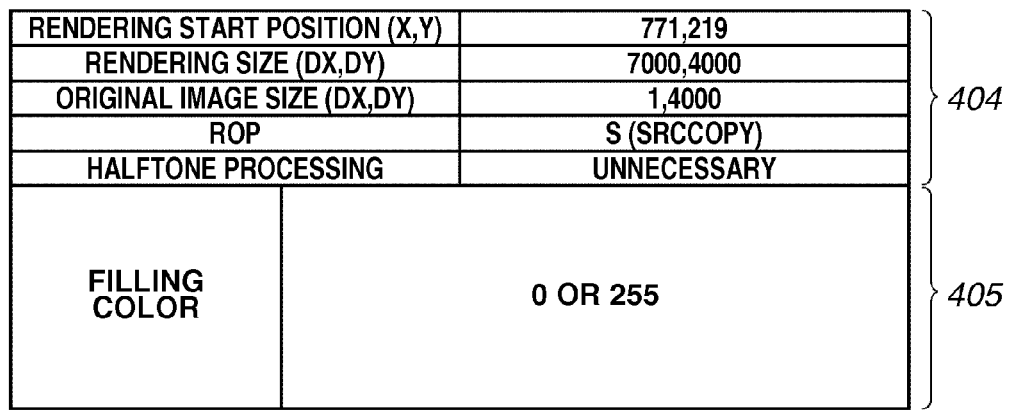

FIG.7
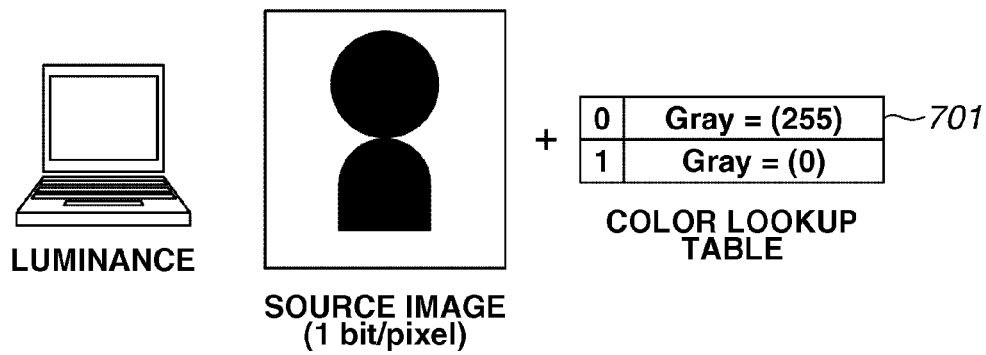
LUMINANCE
SOURCE IMAGE
(1 bit/pixel)
| 0 | Gray = (255) |
| 1 | Gray = (0) |
~701
COLOR LOOKUP
TABLE
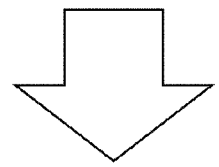
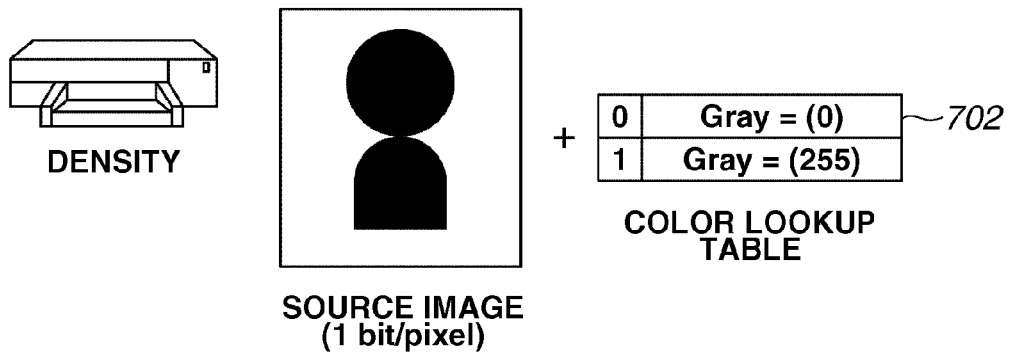
DENSITY
SOURCE IMAGE
(1 bit/pixel)
| 0 | Gray = (0) |
| 1 | Gray = (255) |
~702
COLOR LOOKUP
TABLE

FIG.8
| RENDERING START POSITION (X,Y) | 771,219 |
|---|---|
| RENDERING SIZE (DX,DY) | 400,700 |
| SOURCE IMAGE SIZE (DX,DY) | 400,700 |
| ROP | OVERWRITE (COPYPEN) |
| HALFTONE PROCESSING | NECESSARY |
| COLOR LOOKUP TABLE | 0 | Gray = (0) |
| | 1 | Gray = (255) |
| | OR | |
| | 0 | Gray = (255) |
| | 1 | Gray = (0) |
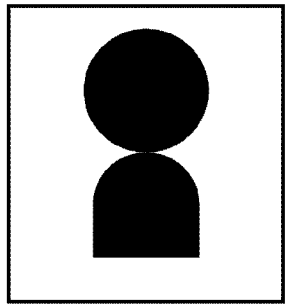
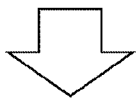
| RENDERING START POSITION (X,Y) | 771,219 | |
|---|---|---|
| RENDERING SIZE (DX,DY) | 400,700 | |
| ORIGINAL IMAGE SIZE (DX,DY) | 400,700 | 801 |
| ROP | OVERWRITE (COPYPEN) OR INVERSELY OVERWRITE (NOTCOPYPEN) | |
| HALFTONE PROCESSING | UNNECESSARY | |
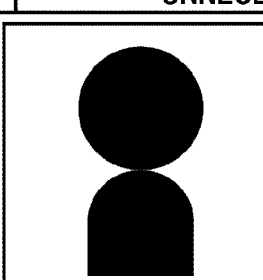
802

FIG.12
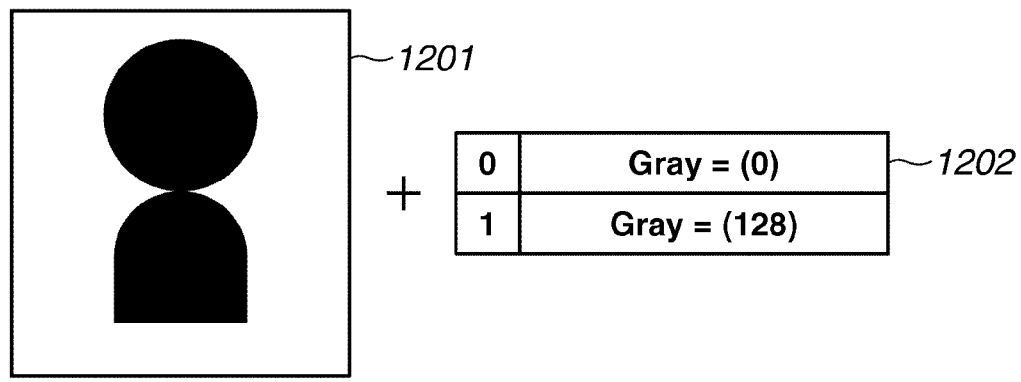
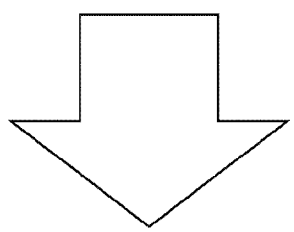
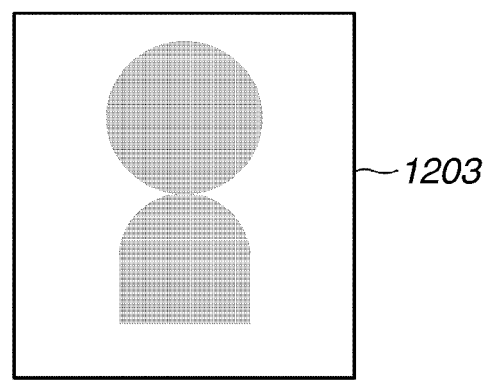

| RENDERING START POSITION (X,Y) | 771,219 |
|---|---|
| RENDERING SIZE (DX,DY) | 400,700 |
| SOURCE IMAGE SIZE (DX,DY) | 400,700 |
| ROP | S (SRCCOPY) |

| COLOR LOOKUP TABLE | 0 | Gray = (0) |
| | 1 | Gray = (128) |

| SOURCE IMAGE | |

⬇

| RENDERING START POSITION (X,Y) | 771,219 |
|---|---|
| RENDERING SIZE (DX,DY) | 400,700 |
| ORIGINAL IMAGE SIZE (DX,DY) | 400,700 |
| ROP | S (SRCCOPY) OR nS (NotSRCCPY) |
| TILE |  |

} 1401

| SOURCE IMAGE | |

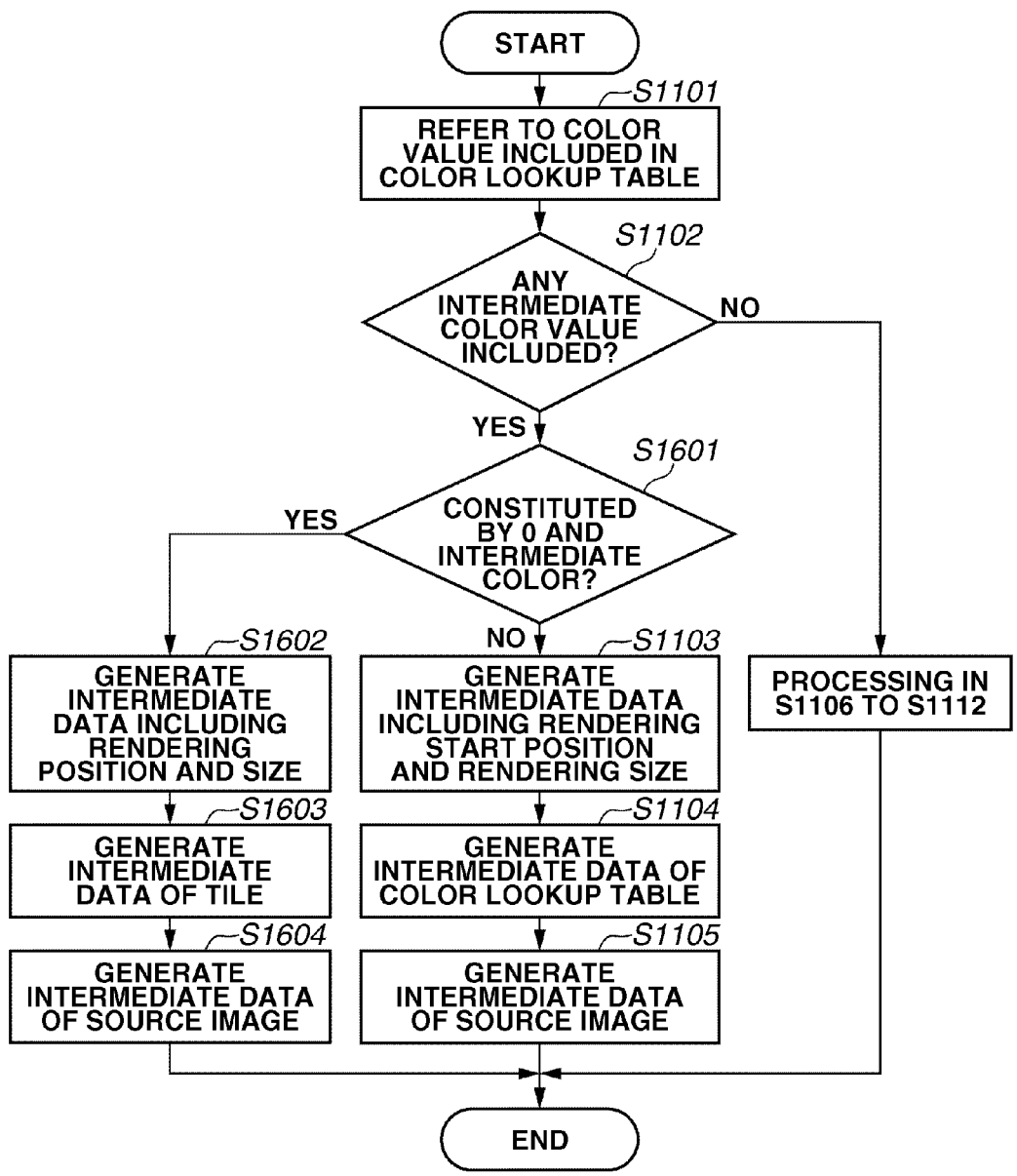

IMAGE PROCESSING FOR RENDERING AN INDEXED COLOR IMAGE

BACKGROUND OF THE INVENTION

1. Field of the Invention

The present disclosure generally relates to image processing and, more particularly, to an image processing technique employable to process an index color image.

2. Description of the Related Art

The index color image is a bitmap image having a format capable of expressing an image with a color value defined in a color lookup table, instead of directly designating a color value for each pixel to express the image. The substance of image data constituting an index color image (i.e., a source image) is characteristic in that each pixel is defined by a reference number designating a color value defined in the color lookup table, not the color value itself. In a case where the number of colors included in an image is smaller, using an index color image is useful to reduce the amount of data while maintaining the resolution appropriately. Recently, index color images have been frequently used to satisfy various requirements with respect to color and resolution. As a method for speedily rendering an index color image, it is conventionally known to share the same color lookup table among a plurality of index color images as discussed in Japanese Patent Application Laid-Open No. 2004-25572.

Frequent usage of index color images possibly induces an increase of unnecessary expression of an image using an index color image, such as a simple image in which all of color values defined in the color lookup table is the same color.

SUMMARY OF THE INVENTION

The present disclosure is directed to a method for speedily rendering an image in a case where no index color image is required to express the image.

According to an aspect of the present disclosure, an image processing apparatus includes a receiving unit configured to receive image data including a color lookup table, and a rendering unit configured to render the image data without referring to the color lookup table for each pixel if a combination of color values defined in the color lookup table is a predetermined combination.

Further features of the present disclosure will become apparent from the following description of exemplary embodiments with reference to the attached drawings.

BRIEF DESCRIPTION OF THE DRAWINGS

FIG. 3 illustrates an example of a first index color image.

FIG. 4 illustrates a format conversion example of the first index color image.

FIG. 7 illustrates an example of a second index color image.

FIG. 8 illustrates a format conversion example of the second index color image.

FIG. 12 illustrates an example of a third index color image.

FIG. 16 is a flowchart illustrating format conversion processing applicable to an index color image according to a second exemplary embodiment.

DESCRIPTION OF THE EMBODIMENTS

Various exemplary embodiments, features, and aspects of the disclosure will be described in detail below with reference to the drawings.

Figure 1:
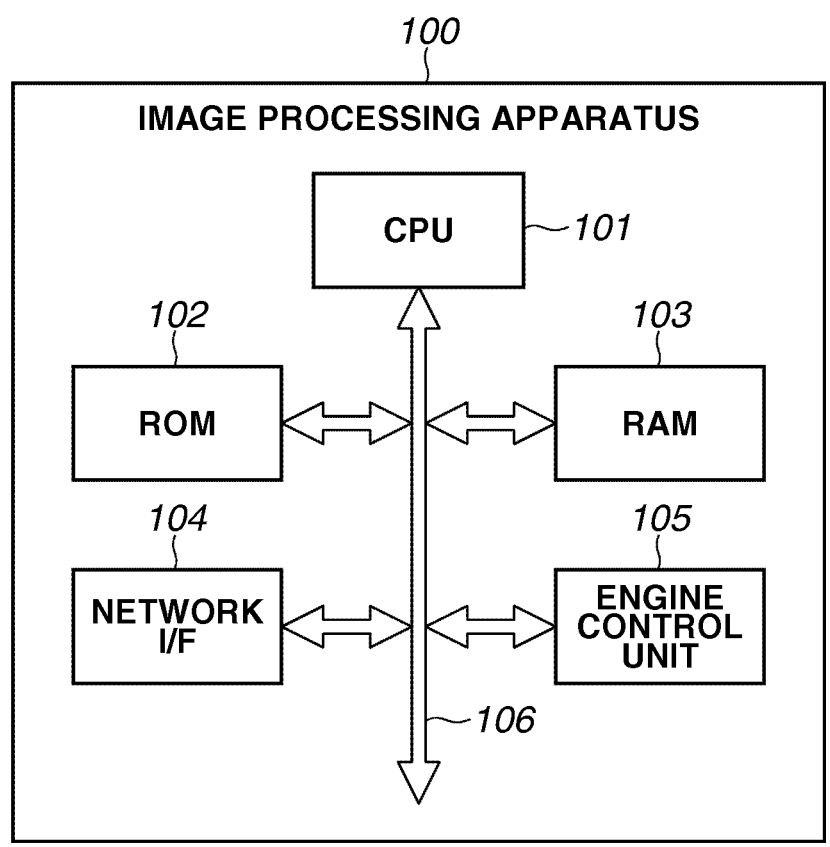
FIG. 1 illustrates a hardware configuration of an image processing apparatus.

FIG. 1 illustrates a hardware configuration of an image processing apparatus 100 according to a first exemplary embodiment of the present disclosure. The image processing apparatus 100 includes a central processing unit (CPU) 101, a read only memory (ROM) 102, a random access memory (RAM) 103, a network interface (I/F) 104, an engine control unit 105, and an engine unit (not illustrated). The image processing apparatus 100 according to the present exemplary embodiment is a laser beam printer, an inkjet printer, a single function printer (SFP), or a multifunction peripheral (MFP).

The CPU 101 can control the image processing apparatus 100 by reading a control program or an image processing program, which is used to execute processing of a flowchart described below, from the ROM 102. The ROM 102 stores various information including the control program and the image processing program. The RAM 103 is usable as a temporary storage area, such as a main memory or a work area, for the CPU 101. The network interface 104 can communicate with an external apparatus. The engine control unit 105 can execute processing for causing an engine unit (not illustrated) to print an image, which has been formed based on page description language (PDL) data input from an external apparatus via the network interface 104, on an actual sheet (e.g., a paper). The engine unit (not illustrated) can output a printed product, which results through the processing for printing an image on a paper.

The present disclosure is applicable not only to PDL data but also to various document formats, although the present exemplary is described based on PDL data. The above-mentioned constituent components of the image processing apparatus 100 are mutually connected via an internal bus 106. The PDL data can be generated by application software installed on an external apparatus (e.g., a personal computer (PC)).

Figure 2:
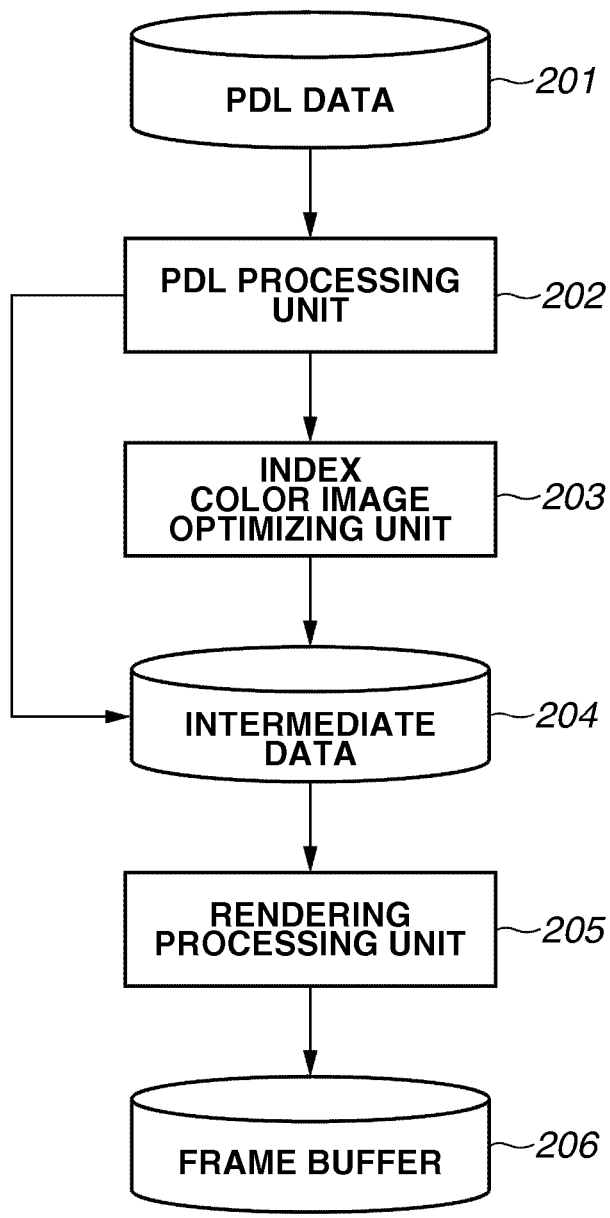
FIG. 2 illustrates a software module configuration and a data configuration of the image processing apparatus.

FIG. 2 illustrates a software module configuration and a data configuration according to the present exemplary embodiment. To realize the software module configuration, the CPU 101 cooperates with respective units illustrated in FIG. 1 to execute the image processing program stored in the ROM 102.

PDL data 201 can be received via the network interface 104 and can be stored in the RAM 103 of the image processing apparatus 100.

A PDL processing unit 202 is configured to read the PDL data 201 from the RAM 103, generate intermediate data 204, and store the generated intermediate data 204 in the RAM 103. Further, in a case where an index color image is read from the PDL data 201, the PDL processing unit 202 causes an index color image optimizing unit 203 to generate the intermediate data 204.

The index color image optimizing unit 203 is configured to generate the intermediate data 204 by converting the format of the index color image into another format other than an index color format in such a way as to speedily complete rendering processing. The generated intermediate data 204 can be stored in the RAM 103.

A rendering processing unit 205 is configured to render pixels of a rendering target on a frame buffer 206 based on the intermediate data 204 stored in the RAM 103. When the rendering processing unit 205 renders an image on the frame buffer 206, the rendering processing unit 205 performs halftone processing according to the gradation expression capability of the image processing apparatus 100. In the present exemplary embodiment, the gradation expression capability of the image processing apparatus 100 is limited to 1 bit/pixel. The rendering processing unit 205 performs halftone processing on a color value data of 8 bit/pixel and generates 1 bit/pixel data.

The frame buffer 206 is a memory area of the RAM 103, which has been secured to store rendering results obtained by the rendering processing unit 205. The rendering results stored in the frame buffer 206 can be transmitted to the engine control unit 105 and subjected to print processing.

FIRST EXAMPLE

A first example, in which the format of an index color image is converted into another format to complete the rendering processing speedily, is described in detail below with reference to FIGS. 3 to 6.

FIG. 3 illustrates an example of the PDL data 201. A page 3010 included in the PDL data 201 is constituted by a background image 3020, character strings 3030 and 3040, and a binary image 3050. The character strings 3030 and 3040 and the binary image 3050 are rendered on the background image 3020.

The background image 3020 is an image filled with a single color of either white or black. An index color image is usable as the image 3020. For example, the usable image is an index color image for which only 0 indicating white color is used as color values defined in a color lookup table. In many cases, template data commonly usable for each page is constituted in such a way as to fill the background with either white or black. When the processing for filling the background with a white or black color is necessary for each page, optimizing the index color image the entire surface of which is filled with a single color of either white or black is useful to improve the speed of the rendering processing greatly.

The above-mentioned index color image is constituted by a data table 303, a source image 304, and a color lookup table 305. The data table 303 includes information about starting position (X, Y) indicating the position where an image is formed (i.e., rendering start position), information about destination size (Dx, Dy) indicating the entire image size (i.e., rendering size), and information about Src Size (Dx, Dy) indicating the size of the source image 304 (i.e., source image size).

According to the data table 303 illustrated in FIG. 3, the rendering start position of the index color image is a coordinate position (771, 219). The entire image size of the index color image is 7,000 in width and 4,000 in height. The size of the source image 304 is 1 in width and 4,000 in height. Further, the source image 304 according to the present exemplary embodiment is a bitmap image of 1 bit/pixel, which includes a description of reference number that is either "0" or "1" usable to refer to the color lookup table 305 for each pixel.

In a case where the source image is a bitmap image of 1 bit/pixel, a pixel having pixel value "0" is referred to as a pixel of off-bit (i.e., OFF pixel) and a pixel having pixel value "1" is referred to as a pixel of on-bit (i.e., ON pixel). The OFF pixel corresponds to a color value of reference number "0" in the color lookup table. The ON pixel corresponds to a color value of reference number "1."

The color lookup table according to the present exemplary embodiment includes a definition of two colors. When the color lookup table includes the definition of two colors, a reference number representing the first color is "0" and a reference number representing the second color is "1." For example, one of two color lookup tables 305 vertically disposed in FIG. 3 is employable. The upper color lookup table is characteristic in that a color value corresponding to the reference number "0" is Gray=(0) and a color value corresponding to the reference number "1" is Gray=(0). The lower color lookup table is characteristic in that a color value corresponding to the reference number "0" is Gray=(255) and a color value corresponding to the reference number "1" is Gray=(255). In the present exemplary embodiment, Gray (0) represents a minimum color value(=0) in the gray scale and Gray (255) represents a maximum color value(=255) in the gray scale.

In the present exemplary embodiment, the pixel value of the OFF pixel is "0" and the pixel value of the ON pixel is "1", as described above. In general, when the color lookup table includes a definition of two colors, it is useful to designate a pixel having a color value corresponding to the smallest reference number as "OFF pixel" and a pixel having another color value as "ON pixel."

In rendering an index color image, the PDL processing unit 202 reads the PDL data 201 and generates the intermediate data 204 that includes, for example, a data table 401, a lookup table 402, and a source image 403 illustrated in FIG. 4. In a case where the format of the index color image is not converted into another format, the PDL data 201 constituted by the data table 303, the source image 304, and the color lookup table 305 is equivalent to the intermediate data 204 constituted by the data table 401, the source image 403, and the lookup table 402.

The intermediate data 204 illustrated in the upper part of FIG. 4 is described in detail below. The data table 401 of the intermediate data 204 includes fields for "rendering start position" of the image, "rendering size" of the image, "source image size" to be employed in rendering the image, type of raster operation ("ROP") to be performed on the image, and information indicating whether to perform the halftone processing. The lookup table 402 defines a color value corresponding to each reference number. According to the example illustrated in FIG. 4, the color values corresponding to the reference numbers "0" and "1" are defined to be either the minimum color value "0" or the color values corresponding to the reference numbers "0" and "1" are defined to be the maximum color value "1." The source image 403 is a bitmap image to be used in rendering the image. As mentioned above, the source image 403 is a bitmap image of 1 bit/pixel, which includes a description about the reference number "0" or "1" to be used in referring to the color lookup table 305 for each pixel. The size of the source image 403 is described in the "source image size" field of the data table 401.

In the present exemplary embodiment, the index color image optimizing unit 203 converts the format of the PDL data 201 illustrated in FIG. 3 into another format that does not use any color lookup table and generates intermediate data 204 that includes a data table 404 and filling color information 405 illustrated in the lower part of FIG. 4.

The intermediate data illustrated in the lower part of FIG. 4, which can be generated through the index color image format conversion processing performed by the index color image optimizing unit 203, is described in detail below. The data table 404 includes fields for "rendering start position" of the image, "rendering size" of the image, "original image size" to be used in rendering the filling image, type of ROP to be performed on the image, and information indicating whether to perform the halftone processing. In the present exemplary embodiment, the filling color 405 is either the minimum color value "0" or the maximum color value "255." More specifically, the filling color becomes "0" when the color values corresponding to the reference numbers "0" and "1" are defined to be the minimum color value "0" in the color lookup table 402. Further, the filling color becomes "255" when the color values corresponding to the reference numbers "0" and "1" are defined to be the minimum color value "255" in the color lookup table 402.

Two colors defined in the color lookup table 305 of the PDL data 201 illustrated in FIG. 3 have the same color value. Therefore, the rendering result of the index color image does not depend on the reference number described in the source image 304. Therefore, the index color image optimizing unit 203 generates the intermediate data 204 that includes the data table 404 and the filling color information 405 and does not include any source image, as illustrated in the lower part of FIG. 4.

More specifically, the index color image optimizing unit 203 generates intermediate data by converting the index color image into an image having another format that can obtain an equivalent rendering result although the color lookup table and the source image are omitted. Through the above-mentioned format conversion processing, as described below with reference to FIG. 5, the processing to be performed each time when a pixel is written on the frame buffer 206 can be simplified. More specifically, it is unnecessary to refer to a source image pixel. It is unnecessary to acquire a color value indicated by a reference number of the referred pixel from the color lookup table. In other words, the rendering processing can be speedily completed.

Further, the index color image optimizing unit 203 generates intermediate data that does not require any halftone processing to be performed for each pixel of the rendering target in a case where the values included in the color lookup table 305 are either the minimum color value "0" or the maximum color value "255."

When the values included in the color lookup table 305 are either the minimum color value "0" or the maximum color value "255", it can be known beforehand that each of all pixels becomes either 0 or 1 if the index color image optimizing unit 203 performs halftone processing to obtain 1 bit/pixel data. Therefore, the index color image optimizing unit 203 generates intermediate data that includes information indicating that the halftone processing is unnecessary. Therefore, the rendering processing unit 205 can omit the halftone processing.

<Rendering of Index Color Image not Requiring any Format Conversion>

Figure 5:
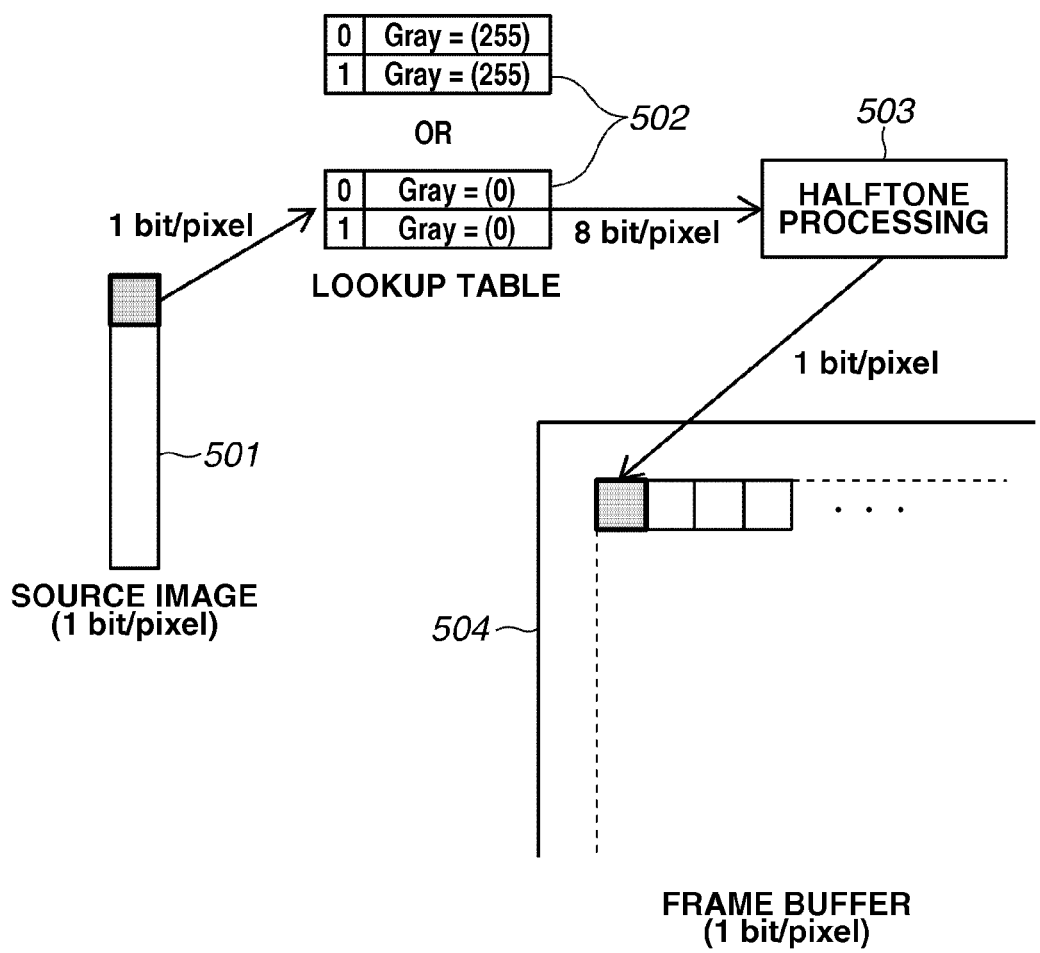
FIG. 5 illustrates an example of rendering processing applicable to the first index color image.

FIG. 5 illustrates a flow of processing that can be performed by the rendering processing unit 205 without converting the format of an index color image described in the first example.

To render an index color image without performing any format conversion, the rendering processing unit 205 acquires a reference number of 1 bit/pixel from a source image 501 and converts the acquired reference number into a color value of 8 bit/pixel with reference to a color lookup table 502.

Then, the rendering processing unit 205 performs halftone processing (see 503) on the above-mentioned color value of 8 bit/pixel to determine each pixel value to be written on a frame buffer 504.

Then, the rendering processing unit 205 writes the determined pixel value on the frame buffer 504 to render an index color image.

The rendering processing unit 205 repeats the above-mentioned processing, including (1) acquiring the reference number from the source image, (2) converting the acquired reference number into the corresponding color value with reference to the color lookup table, and (3) determining the pixel value through the halftone processing performed on the color value, for each pixel of the rendering target on the frame buffer. As a result, it takes a significant long time to complete the rendering processing because the processing flow described with reference to FIG. 5 is applied even when the processing target image is a simple image in which the combination of color values defined in the color lookup table indicates filling of a single color (e.g., white or black).

<Rendering of Index Color Image Requiring Format Conversion>

Figure 6:
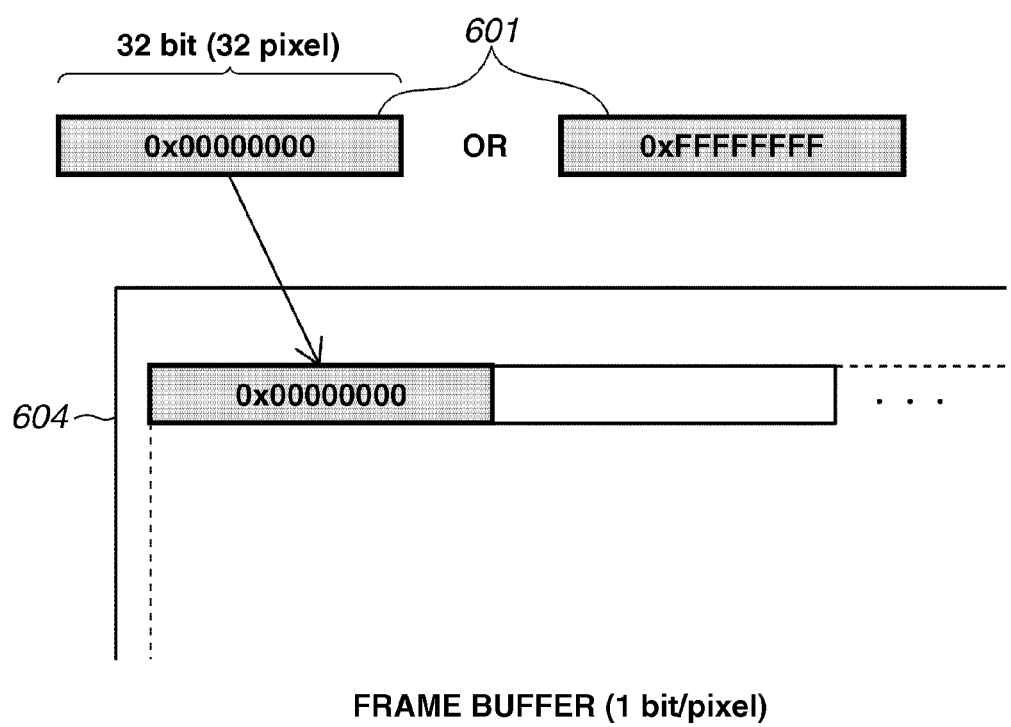
FIG. 6 illustrates an example of rendering processing applicable to the first index color image whose format has been converted.

FIG. 6 illustrates a flow of processing that can be performed by the rendering processing unit 205 to perform rendering processing after converting the format of the index color image illustrated in FIG. 4, described in the first example, into another format according to the present exemplary embodiment.

It is understood that the rendering result of the index color image on the frame buffer becomes either "0" or "1" in pixel value of each pixel by identifying the combination of color values defined in the color lookup table of the index color image illustrated in FIG. 4. Therefore, the index color image optimizing unit 203 converts the format of the index color image and generates the intermediate data 204 that includes the data table 404 and the filling color information 405 and does not include any source image and any color lookup table, as illustrated in the lower part of FIG. 4. The data table 404 of the intermediate data 204 further includes information indicating that the rendering processing unit 205 is not required to perform the halftone processing.

The rendering processing unit 205 analyzes the intermediate data 204 and identifies the color value of the filling color of the image to be rendered and the necessity of the halftone processing. In the present exemplary embodiment, the rendering processing unit 205 determines whether the color value of the filling color is either the minimum color value "0" or the maximum color value "255" and there is information indicating that the halftone processing is unnecessary.

Then, if it is determined that the color value of the filling color is either the minimum color value "0" or the maximum color value "255" and there is the information indicating that the halftone processing is unnecessary, the rendering processing unit 205 performs the following processing. For example, the rendering processing unit 205 generates data 601 composed of 32 pixels being consecutively arrayed as illustrated in FIG. 6 and having the minimum pixel value "0" or the maximum pixel value "1" of the frame buffer. Then, using the generated data 601, the rendering processing unit 205 writes pixel values of a plurality of pixels entirely on a frame buffer 604.

More specifically, if it is determined that the color value of the filling color is either the minimum color value "0" or the maximum color value "255" and there is the information indicating that the halftone processing is unnecessary based on the analysis, the rendering processing unit 205 determines pixel values of a plurality of pixels according to the color value of the filling color. Then, the rendering processing unit 205 writes the pixel values of a plurality of pixels entirely on the frame buffer. In this case, the rendering processing unit 205 determines the pixel values to be written on the frame buffer without referring to the color lookup table.

On the other hand, if it is not determined that the color value of the filling color is either the minimum color value "0" or the maximum color value "255" and there is the information indicating that the halftone processing is unnecessary, the rendering processing unit 205 performs the processing illustrated in FIG. 5. More specifically, the rendering processing unit 205 acquires a color value for each pixel of the rendering target with reference to the source image and the color lookup table and writes a pixel value obtainable by performing the halftone processing on the acquired color value into the frame buffer.

As mentioned above, according to the first example of the present exemplary embodiment, the index color image optimizing unit 203 converts the format of an index color image into another format to obtain an image that does not refer to any source image and any color lookup table and does not require the halftone processing. Then, the index color image optimizing unit 203 generates intermediate data of the converted image. Thus, the rendering processing unit 205 can write pixel values of a plurality of pixels (e.g., 32 pixels) on the frame buffer at a time without referring to any source image or any color lookup table and without performing any halftone processing. As a result, the time to complete the rendering processing can be reduced greatly compared to the processing flow illustrated in FIG. 5.

SECOND EXAMPLE

A second example, in which the format of an index color image is converted into another format to complete the rendering processing speedily, is described in detail below with reference to FIGS. 7 to 10.

FIG. 7 illustrates an example of the PDL data 201. In general, a personal computer (PC) controls the luminance to express an image on a display device thereof. An image processing apparatus controls the density to print an image. Therefore, the PC uses a color lookup table 701 dedicated to the conversion of luminance. The printing apparatus uses a color lookup table 702 dedicated to the conversion of luminance to density. Like a simple conversion between luminance and density, it is usual to determine whether or not to reverse a source image in a case where color values of the color lookup table are constituted by the minimum color value "0" and the maximum color value "255."

The above-mentioned control to reverse or not reverse the source image is feasible without using any color lookup table if the rendering processing unit 205 can switch ROP processing to render the image. Therefore, if an input index color image has a color lookup table constituted by the minimum color value "0" and the maximum color value "255" illustrated in FIG. 7 as a combination of color values, the index color image optimizing unit 203 performs the following processing. More specifically, the index color image optimizing unit 203 converts the input index color image into intermediate data illustrated in the lower part of FIG. 8.

In this case, the index color image optimizing unit 203 generates intermediate data that does not include any color lookup table although it includes the data table 801 and the source image 802. When the intermediate data does not include any color lookup table, it is unfeasible to reverse the source image 802 by acquiring color values with reference to the color lookup table. Instead, the index color image optimizing unit 203 converts the ROP included in the data table 801 into ROP that performs inverse processing to render a reverse image of the source image 802.

In a case where a density image is rendered on the frame buffer 206, if a color value corresponding to the reference number "0" is the minimum color value "0" and a color value corresponding to the reference number "1" is the maximum color value "255" in the color lookup table, the index color image optimizing unit 203 designates COPYPEN in the field of ROP. More specifically, the index color image optimizing unit 203 generates intermediate data in such a way as to designate ROP that directly writes the source image without reversing it if the color value corresponding to the OFF pixel of the source image is the minimum color value and the color value corresponding to the ON pixel of the source image is the maximum color value in the combination of color values defined in the color lookup table.

Further, if the color value corresponding to the reference number "0" is the maximum color value "255" and the color value corresponding to the reference number "1" is the minimum color value "0" in the color lookup table, the index color image optimizing unit 203 designates NOTCOPYPEN in the field of ROP. More specifically, the index color image optimizing unit 203 generates intermediate data in such a way as to designate ROP that writes a reversed source image if the color value corresponding to the OFF pixel of the source image is the maximum color value and the color value corresponding to the ON pixel of the source image is the minimum color value in the combination of color values defined in the color lookup table.

In other words, in the above-mentioned determination with respect to the combination of color values, the index color image optimizing unit 203 determines whether an image to be written on the frame buffer based on the combination of color values becomes equivalent to the source image. Further, the index color image optimizing unit 203 determines whether the image to be written on the frame buffer becomes equivalent to the reverse image of the source image.

If the image to be written based on the combination of color values becomes equivalent to the source image, the image processing apparatus renders each pixel of a rendering target based on a corresponding pixel value of the source image without referring to any color lookup table for each pixel. Further, if the image to be written based on the combination of color values becomes equivalent to the reverse image of the source image, the image processing apparatus renders each pixel of the rendering target based on a corresponding pixel value of the reverse image of the source image without referring to any color lookup table for each pixel.

<Rendering of Index Color Image not Requiring any Format Conversion>

Figure 9:
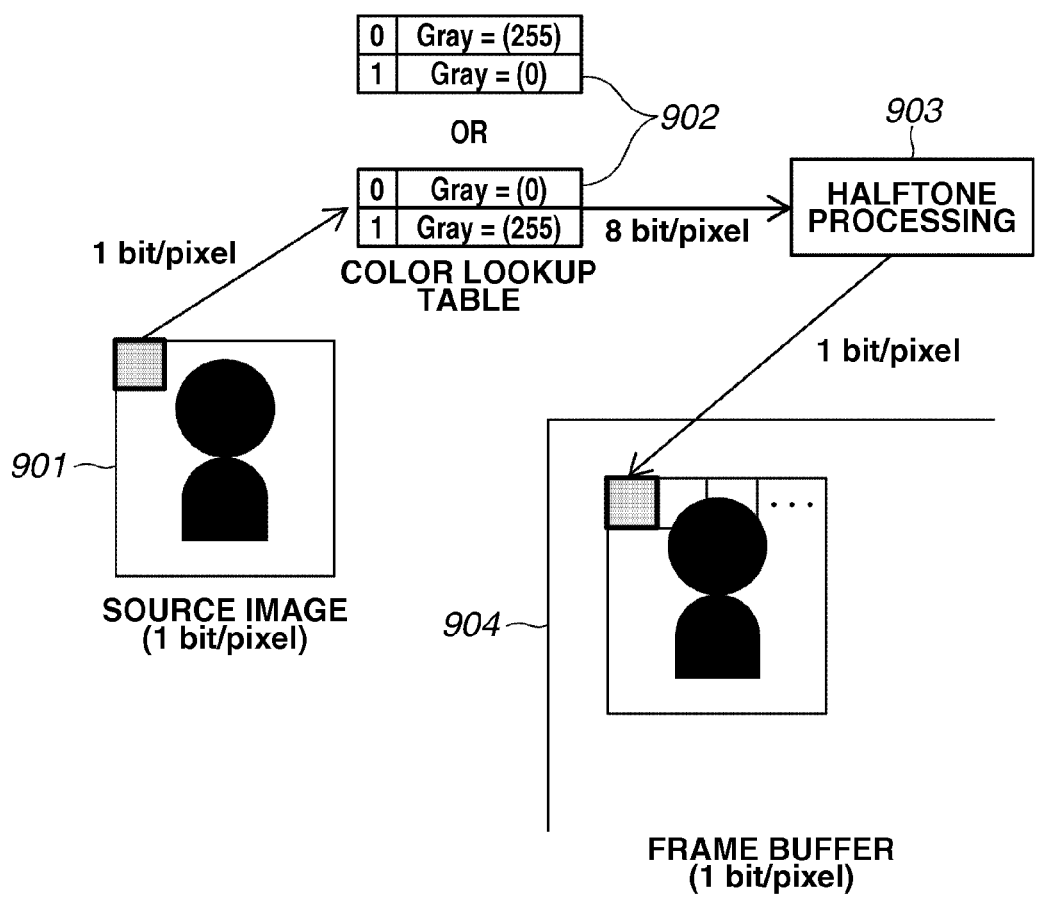
FIG. 9 illustrates an example of rendering processing applicable to the second index color image.

FIG. 9 illustrates a flow of processing that can be performed by the rendering processing unit 205 without converting the format of an index color image described in the second example. In the processing flow illustrated in FIG. 9, the rendering processing unit 205 acquires a reference number of 1 bit/pixel from a source image 901 and converts the acquired reference number into a color value of 8 bit/pixel with reference to a color lookup table 902. Then, the rendering processing unit 205 performs halftone processing (see 903) on the above-mentioned color value of 8 bit/pixel to determine each pixel value and writes the determined pixel value on a frame buffer 904.

The rendering processing unit 205 repeats the above-mentioned processing, including (1) acquiring the reference number from the source image, (2) converting the acquired reference number into the corresponding color value with reference to the color lookup table, and (3) determining the pixel value through the halftone processing performed on the color value, for each pixel of the rendering target on the frame buffer. Therefore, the processing flow illustrated in FIG. 9 takes a significant long time to complete the rendering processing.

<Rendering of Index Color Image Requiring Format Conversion>

Figure 10:
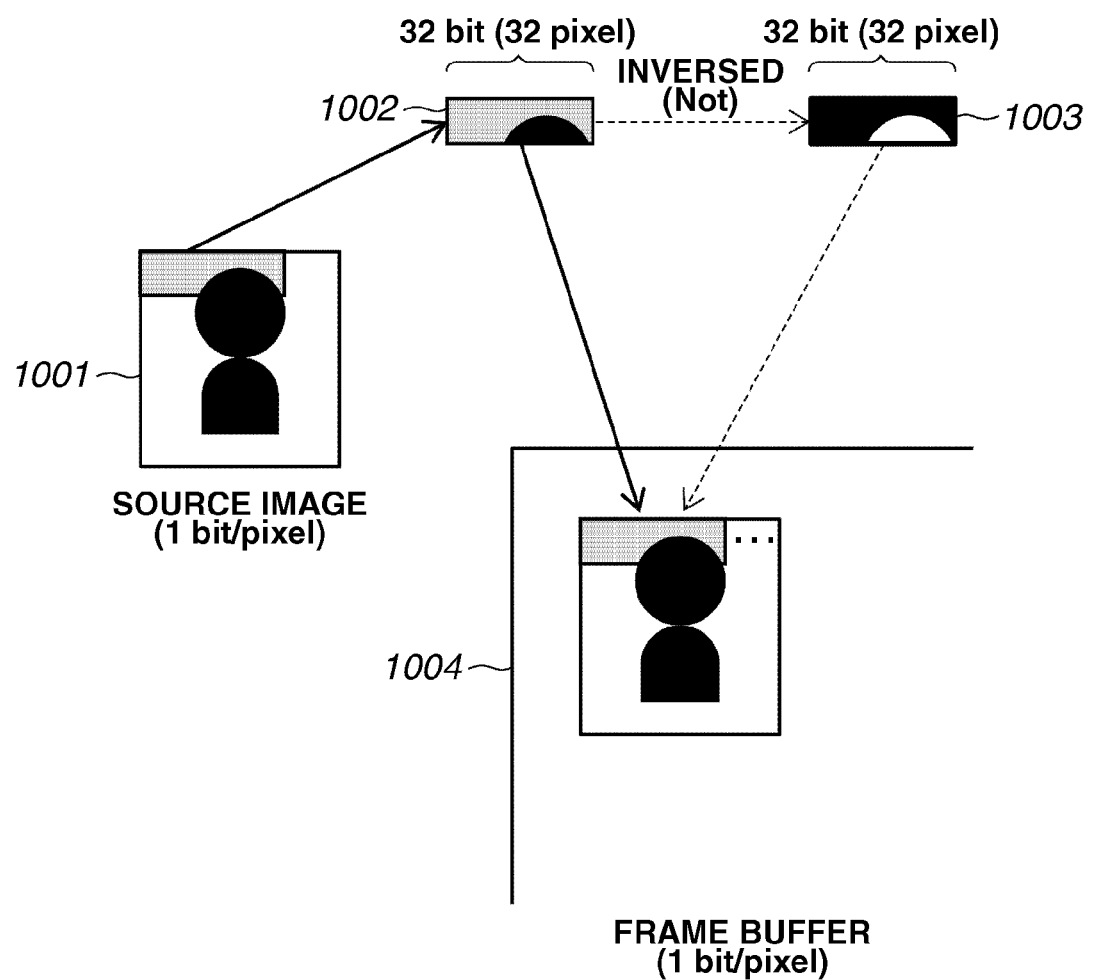
FIG. 10 illustrates an example of rendering processing applicable to the second index color image whose format has been converted.

FIG. 10 illustrates a flow of processing that can be performed by the rendering processing unit 205, which is different from the processing flow illustrated in FIG. 9 in that the rendering processing is performed after the format of the index color image described in the second example is converted into another format according to the present exemplary embodiment.

It is understood that the rendering result of the index color image illustrated in FIG. 8 becomes either a direct rendering of the source image or an inverse rendering of the source image by identifying the combination of color values defined in the color lookup table of the index color image illustrated in FIG. 8.

Therefore, the index color image optimizing unit 203 generates intermediate data that includes a source image and does not include any color lookup table, more specifically, includes the data table 801 and the source image 802 illustrated in the lower part of FIG. 8. The data table 801 of the generated intermediate data further includes information indicating that the rendering processing unit 205 does not perform any halftone processing.

Further, when the source image is directly rendered, OVERWRITE (COPYPEN) indicating rendering processing to be performed without reversing the source image is designated in the field of ROP included in the intermediate data. On the other hand, when the reversed source image is rendered, INVERSELY OVERWRITE (NOTCOPYPEN) indicating rendering processing to be performed after the source image is reversed is designated in the field of ROP.

In this case, the index color image optimizing unit 203 generates intermediate data according to the above-mentioned method.

The rendering processing unit 205 analyzes the generated intermediate data and determines whether the designation described in the field of ROP is OVERWRITE (COPYPEN) or INVERSELY OVERWRITE (NOTCOPYPEN) with respect to the rendering of the source image.

The rendering processing unit 205 acquires data 1002 composed of 32 pixels being consecutively arrayed from a source image 1001. If the designation described in the field of ROP is COPYPEN, the rendering processing unit 205 directly writes the data 1002 (without reversing it) on a frame buffer 1004. Further, if the designation described in the field of ROP is NOTCOPYPEN, the rendering processing unit 205 generates reversed data 1003 of the 32-pixel data 1002 acquired from the source image 1001 and writes the reversed data 1003 on the frame buffer 1004.

As mentioned above, according to the second example of the present exemplary embodiment, the index color image optimizing unit 203 converts the index color image in such a way as to generate intermediate data that does not refer to any color lookup table and does not require any halftone processing. Further, the index color image optimizing unit 203 converts the ROP into an inverse ROP with reference to the combination of color values defined in the color lookup table. Then, the index color image optimizing unit 203 generates intermediate data of the converted image. Thus, the rendering processing unit 205 can acquire a plurality of pixels (e.g., 32 pixels) from the source image and write the acquired pixels on the frame buffer at a time without referring to any color lookup table and without performing any halftone processing.

More specifically, according to the second example in the present exemplary embodiment, the image processing apparatus determines a pixel value of the source image or a pixel value of the reversed source image as a pixel value to be written on the frame buffer without referring to the color lookup table for each pixel. As a result, the time to complete the rendering processing can be reduced greatly compared to the processing flow illustrated in FIG. 5.

<Flow of Index Color Image Format Conversion Processing>

An example flow of processing that can be performed by the index color image optimizing unit 203 to perform the format conversion processing according to the above-mentioned first and second examples is described in detail below with reference to FIG. 11. A program that enables the index color image optimizing unit 203 to perform the format conversion processing is stored in the ROM 102 and can be loaded into the RAM 103 when the CPU 101 executes the program. Further, the PDL data 201, the intermediate data 204, and the frame buffer 206 are secured in the RAM 103.

In step S1101, the index color image optimizing unit 203 refers to the combination of color values defined in the color lookup table of an index color image.

Then, in step S1102, the index color image optimizing unit 203 determines whether the combination of color values includes any color value other than the minimum color value "0" and the maximum color value "255" (i.e., an intermediate color having a color value in the range from "1" to "254").

If it is determined that an intermediate color value is included in the combination of color values included in the color lookup table (YES in step S1102), the operation proceeds to step S1103. The index color image optimizing unit 203 does not perform any format conversion processing. Therefore, in step S1103, the index color image optimizing unit 203 generates intermediate data of index color image information including rendering start position and rendering size. Further, in step S1104, the index color image optimizing unit 203 generates intermediate data of a color lookup table. Further, in step S1105, the index color image optimizing unit 203 generates intermediate data 204 of a source image.

Rendering processing based on the intermediate data generated in steps S1103 to S1105 is performed, as mentioned above, by performing halftone processing on a color value acquired from the color lookup table for each pixel of the rendering target and rendering each obtainable pixel value on the frame buffer.

If it is determined that the combination of color values does not include any intermediate color value (NO in step S1102), then in step S1106, the index color image optimizing unit 203 determines whether the combination of color values is constituted by either the minimum color value only or the maximum color value only.

If it is determined that the combination of color values is constituted by the minimum color value only (hereinafter, referred to as "first combination") or constituted by the maximum color value only (hereinafter, referred to as "second combination"), the entire area of an image to be rendered on the frame buffer is a single color of the minimum or maximum pixel value without being influenced by the ON and OFF pixel positions of the source image and the halftone processing. Therefore, in step S1107, the index color image optimizing unit 203 generates intermediate data of index color image information including rendering start position and rendering size. In step S1108, the index color image optimizing unit 203 generates intermediate data of filling color having either the minimum color value or the maximum color value.

More specifically, if it is determined that the combination of color values is constituted by the minimum color value only (i.e., the first combination) or constituted by the maximum color value only (i.e., the second combination), the index color image optimizing unit 203 converts the index color image and generates intermediate data in such a way as to exclude any color lookup table and any source image.

If it is not determined that the combination of color values is constituted by the minimum color value only or constituted by the maximum color value only (NO in step S1106), the combination of color values is constituted by the minimum color value and the maximum color value (hereinafter, referred to as "third combination"). In this case, in step S1109, the index color image optimizing unit 203 generates intermediate data of index color image information including rendering start position and rendering size.

Then, in step S1110, the index color image optimizing unit 203 determines whether the color value corresponding to the OFF pixel is the maximum color value and the color value corresponding to the ON pixel is the minimum color value with reference to the color lookup table. More specifically, the index color image optimizing unit 203 determines whether the combination of color values defined in the color lookup table causes any reversion in black-and-white (bit) relationship of the index color image (i.e., the source image). In other words, the index color image optimizing unit 203 determines whether an image to be written based on the combination of color values becomes equivalent to the source image or becomes equivalent to the reverse image of the source image.

If it is determined that the color lookup table causes the reversion of the source image (YES in step S1110), then in step S1111, the index color image optimizing unit 203 inverses (adds NOT to) the ROP included in the data table of the intermediate data generated in step S1109. Thus, the source image can be reversed and written on the frame buffer. In step S1112, the index color image optimizing unit 203 generates intermediate data of a source image without generating any color lookup table.

More specifically, if it is determined that the combination of color values is constituted by the minimum color value and the maximum color value (i.e., the third combination) (NO in step S1106), the index color image optimizing unit 203 converts the index color image and generates intermediate data in such a way as to exclude any color lookup table.

In the above-mentioned exemplary embodiment, the color lookup table includes the definition of two colors. However, the present disclosure is employable even when the color lookup table including 256 colors. According to the first example, the image processing apparatus can perform similar processing when all of 256 colors is either "0" or "255." According to the second example, the image processing apparatus can perform similar processing when the 1st to 255th color values are "0" and the 256th color value is "255."

THIRD EXAMPLE

A third example according to a second exemplary embodiment of the present disclosure, in which the following processing is performed when an index color image is input in addition to the processing described in the first exemplary embodiment, is described below.

The third example, in which the format of an index color image is converted into another format to complete the rendering processing speedily, is described in detail below with reference to FIGS. 12 to 15. FIG. 12 illustrates an example of the PDL data 201. A specific color value (e.g., 128 according to the present exemplary embodiment) defined in a color lookup table 1202 is allocated to each on-bit (i.e., a pixel having a value "1") of a source image 1201 to form an image. The above-mentioned method for using the index color image is inherently known. Even in such a case, it is feasible to convert the index color image rendering method into a simpler rendering method.

Figure 13:
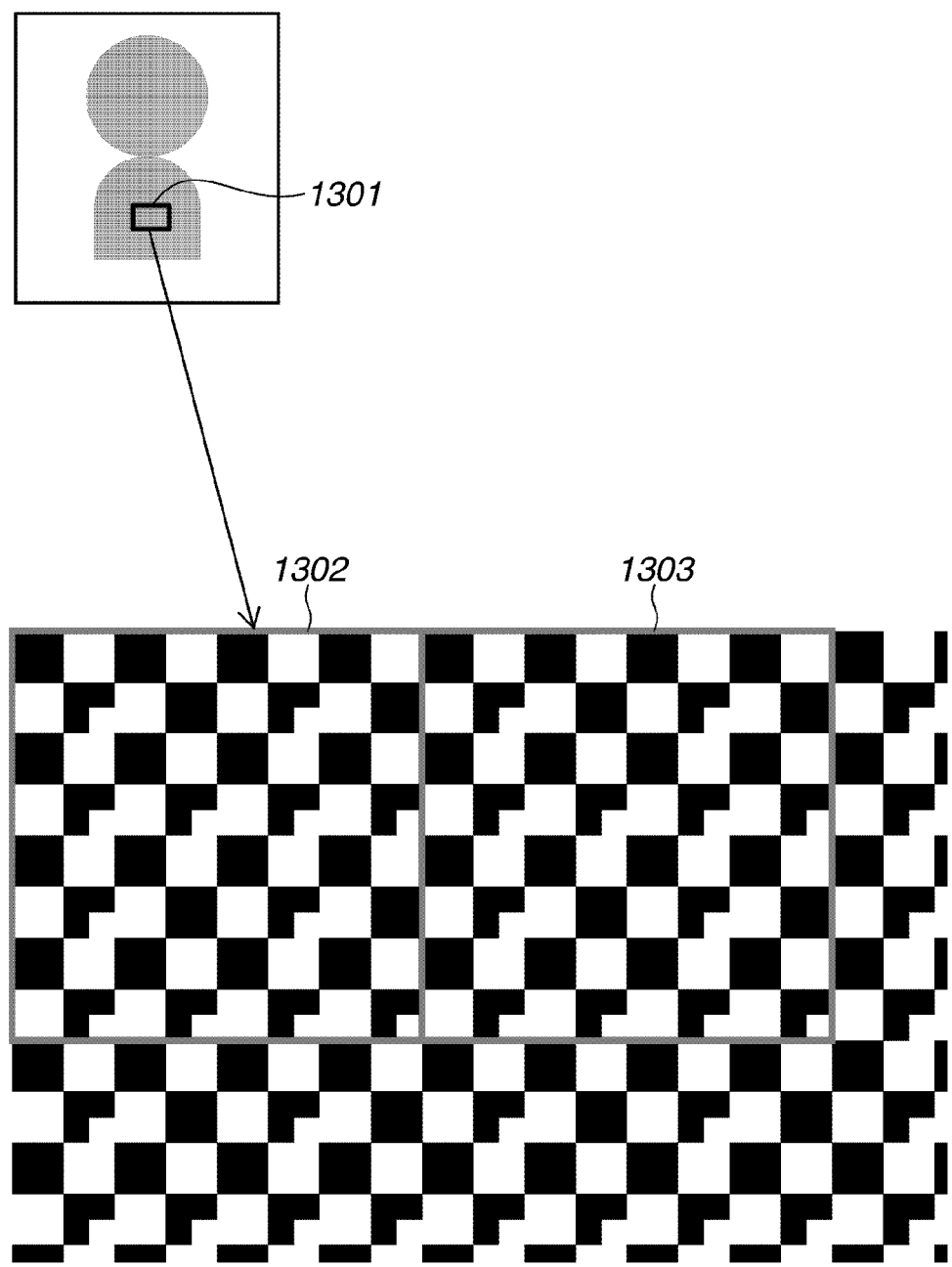
FIG. 13 illustrates an example of a rendering result of the third index color image.

FIG. 13 illustrates details of an image obtainable when the index color image illustrated in FIG. 12 is subjected to rendering processing including the halftone processing according to a dither matrix method. A dither matrix having a specific size (e.g., 16 pixels×16 pixels) is used in the dither matrix method. Therefore, when the specific color is subjected to the halftone processing according to the dither matrix method, a plurality of same images each having the size comparable to the dither matrix can be generated as indicated by reference numerals 1301 and 1302. More specifically, the tiles (halftone patterns) 1301 and 1302 having a plurality of pixel values of the same pattern having the dither matrix size, which can be obtained through halftone processing performed on a specific color using the dither matrix, are arrayed in respective areas of the source image having the reference number "1."

Figure 14:
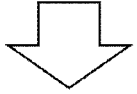
FIG. 14 illustrates a format conversion example of the third index color image.

Therefore, the index color image optimizing unit 203 generates a tile 1401 illustrated in FIG. 14 by performing halftone processing on the specific color (e.g., an intermediate color value corresponding to the reference number "1" in the color lookup table 1202) using the dither matrix. The tile 1401 is a tile having a plurality of pixel values each having the size of the dither matrix (e.g., 16 pixels×16 pixels). Then, the index color image optimizing unit 203 generates intermediate data 204 of the tile 1401.

Then, the rendering processing unit 205 repetitively arranges the tile 1401 in rendering an image on the frame buffer. Thus, the time to complete the rendering processing can be reduced.

Figure 15:
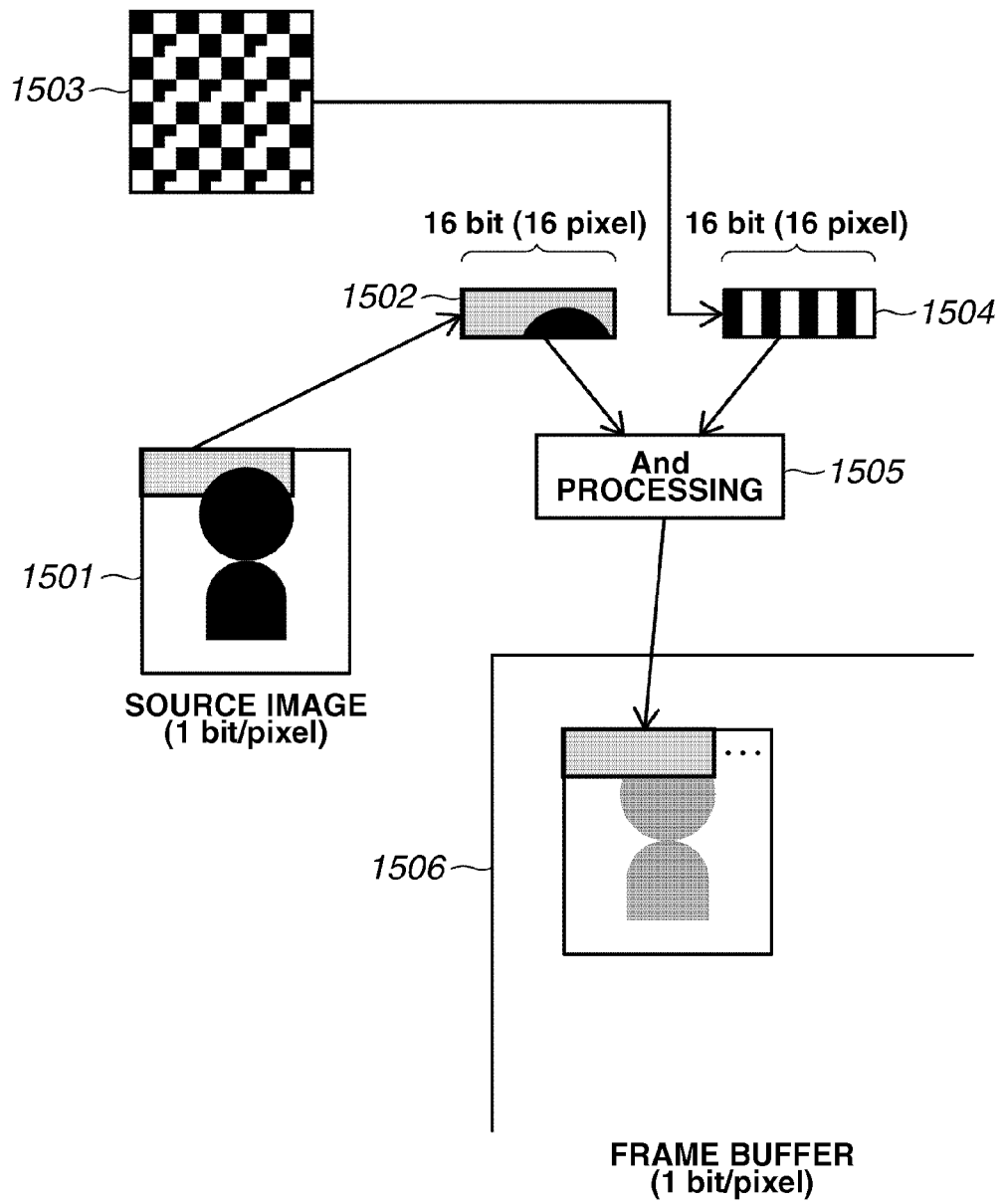
FIG. 15 illustrates an example of rendering processing applicable to the third index color image whose format has been converted.

When the intermediate data 204 illustrated in the lower part of FIG. 14 is generated, the rendering processing unit 205 performs processing illustrated in FIG. 15.

The rendering processing unit 205 extracts an image 1502 of 16 pixels (16 pixels×one pixel) from a source image 1501 and extracts an image 1504 of 16 pixels (16 pixels×one pixel) from a tile 1503. In this case, the image 1502 and the image 1504 are extracted from the source image 1501 and the tile 1503 in such a way as to deviate from each other according to the rendering position on the frame buffer.

Then, the rendering processing unit 205 performs AND processing (see 1505) on the image 1502 and the image 1504 and writes the obtained processing result on a frame buffer 1506. Through the AND processing, each pixel value of a rendering target area of the source image 1501 (e.g., an area filled with a black color in the source image 1501) is replaced by a corresponding pixel value of the tile 1503 and the converted pixel value is written on the frame buffer 1506. In this manner, the rendering processing unit 205 can complete the rendering of the index color image.

As mentioned above, the image processing apparatus can write the pixel values of the tile 1503 entirely on the frame buffer 1506 after these values have been subjected to the halftone processing. Therefore, it is unnecessary to sequentially acquire color values from the color lookup table and perform halftone processing on the acquired color values for respective pixels. As a result, the time to complete the rendering processing can be reduced.

An example flow of processing that can be performed by the index color image optimizing unit 203 to perform the format conversion processing according to the third example is described in detail below with reference to FIG. 16. A program that enables the index color image optimizing unit 203 to perform format conversion processing is stored in the ROM 102 and can be loaded into the RAM 103 when the CPU 101 executes the program. Further, the PDL data 201, the intermediate data 204, and the frame buffer 206 are secured in the RAM 103.

Figure 11:
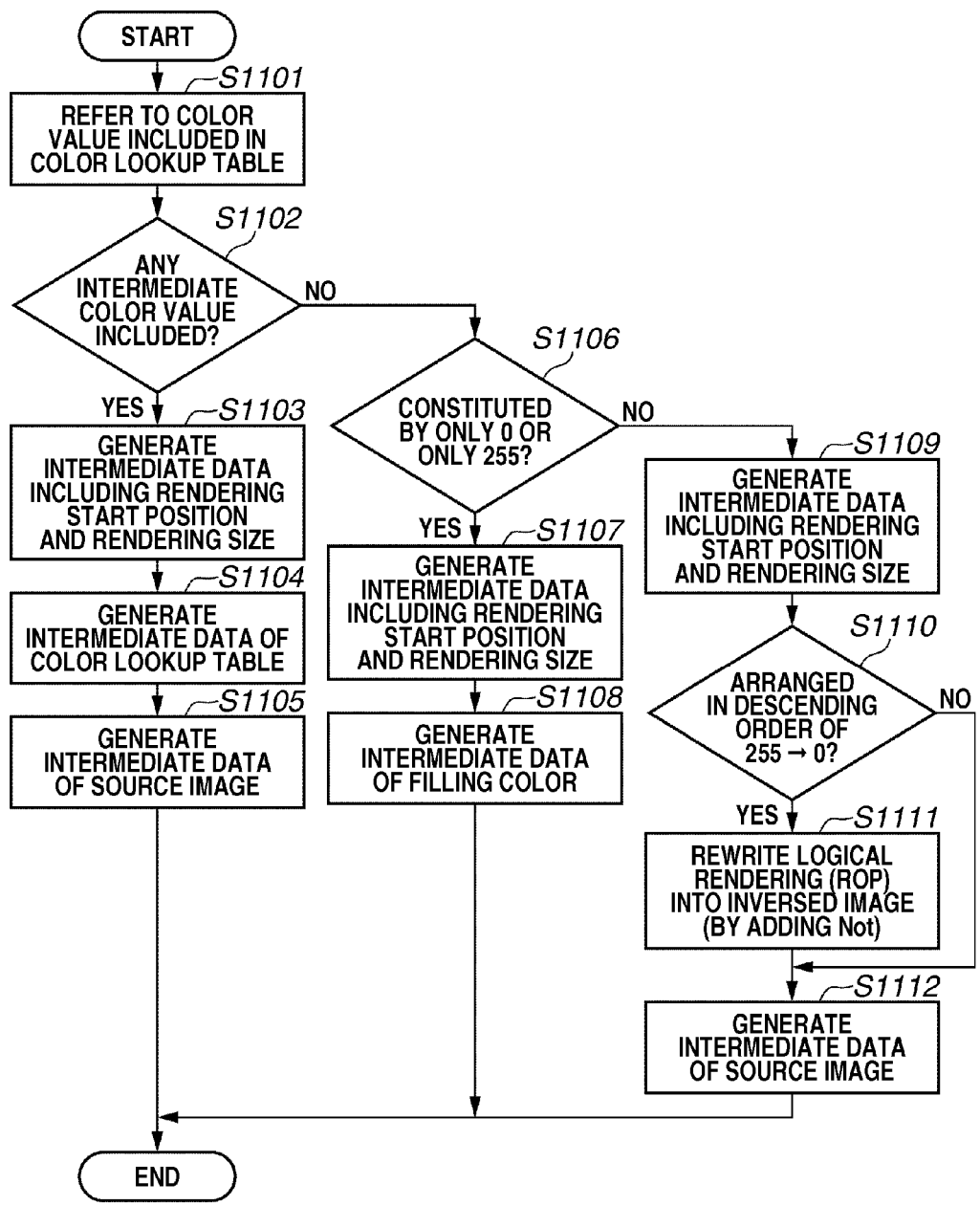
FIG. 11 is a flowchart illustrating format conversion processing applicable to an index color image according to a first exemplary embodiment.

The processing of the flowchart illustrated in FIG. 16 is partly similar to the processing of the flowchart illustrated in FIG. 11. Therefore, the same step numbers (S1101 to S1112) are allocated to corresponding portions in each of the flowcharts illustrated in FIG. 11 and FIG. 16. The processing of the flowchart illustrated in FIG. 16 is partly different from the processing of the flowchart illustrated in FIG. 11. Therefore, only the different portion (i.e., processing to be performed in steps S1601 to S1604) is described in detail below.

If the index color image is neither the first example nor the second example (YES in step S1102), then in step S1601, the index color image optimizing unit 203 determines whether the combination of color values defined in the color lookup table is constituted by the minimum color value "0" and an intermediate color value (in the range from "1" to "254").

If it is determined that the combination of color values defined in the color lookup table is constituted by the minimum color value "0" and the intermediate color value in the range from "1" to "254" (YES in step S1601), then in step S1602, the index color image optimizing unit 203 generates intermediate data of index color image information including rendering start position and rendering size.

Then, in step S1603, the index color image optimizing unit 203 generates intermediate data of a tile using the above-mentioned method.

Further, in step S1603, the index color image optimizing unit 203 generates intermediate data of a source image.

The tile generated in step S1603 has a size comparable to the dither matrix as illustrated in FIG. 14 and all pixels included in the tile are obtainable through halftone processing performed on the second color defined in the color lookup table.

As described above, if the combination of color values defined in the color lookup table is constituted by the minimum color value "0" and an intermediate color value in the range from "1" to "254" (hereinafter, referred to as "fourth combination"), the image processing apparatus converts the index color image into intermediate data of a tile obtainable though halftone processing performed on the intermediate color value beforehand. The converted intermediate data does not include any color lookup table.

On the other hand, if it is determined that the combination of color values defined in the color lookup table is not constituted by the minimum color value "0" and the intermediate color value in the range from "1" to "254" (NO in step S1601), the image processing apparatus performs processing similar to steps S1103 to S1105 of the flowchart illustrated in FIG. 11, which has been described in the first exemplary embodiment.

In the above-mentioned third example, the color values included in the color lookup table is the combination of the minimum color value "0" and an arbitrary intermediate color value (in the range from "1" to "254"). However, the present disclosure is equally applicable to another color lookup table that includes two color values of the same intermediate color. In this case, in step S1601, the index color image optimizing unit 203 determines whether the color values included in the color lookup table are color values of the same intermediate color. More specifically, if it is determined that the color values included in the color lookup table are a color value (e.g., 128) of the same intermediate color, the operation proceeds to steps S1602 to S1604. In this case, in step S1603, the index color image optimizing unit 203 generates a tile having pixel values obtainable through halftone processing performed on each color value of the source image corresponding to the reference number "1."

Further, in the above-mentioned third example, the color values included in the color lookup table are a combination of the minimum color value "0" and an arbitrary intermediate color (in the range from "1" to "254"). However, the present disclosure is equally applicable to another color lookup table that includes two color values of arbitrary intermediate colors (in the range from "1" to "254"). In this case, the determination processing in step S1601 can be skipped. The image processing apparatus constantly performs processing in steps S1602 to S1604. In step S1603, the index color image optimizing unit 203 generates two tiles of two intermediate color values corresponding to the reference numbers "0" and "1", respectively. Then, the index color image optimizing unit 203 generates intermediate data of two generated tiles. Then, in the rendering processing, the rendering processing unit 205 acquires a processing result 1 through AND processing (see 1505) performed on the image 1502 and the image 1504 extracted from the tile 1503 corresponding to the reference number "1" at each on-bit portion (having a value "1", more specifically, reference number "1") of the source image, similar to the processing flow illustrated in FIG. 15. Further, the rendering processing unit 205 acquires a processing result 2 through AND processing performed on an inversely processed (NOT processed) image of the image 1502 extracted from the source image illustrated in FIG. 15 and an image extracted from the tile corresponding to the reference number "0" at each off-bit portion (having a value "0", more specifically, reference number "0") of the source image. Then, the rendering processing unit 205 writes a processing result obtainable through OR processing performed on the processing result 1 and the processing result 2 on the frame buffer 1506.

As mentioned above, even when the combination of color values defined in the color lookup table is constituted by intermediate color values, the image processing apparatus can write the pixel values of the tile entirely on the frame buffer 1506 after these values have been subjected to the halftone processing. Therefore, it is unnecessary to sequentially acquire color values from the color lookup table and perform halftone processing on the acquired color values for respective pixels. As a result, the time to complete the rendering processing can be reduced.

The image processing apparatus according to the above-mentioned exemplary embodiment can speedily render a simple image that does not require any expression using an index color image because the apparatus can convert the format of the index color image appropriately.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-265269 filed Dec. 4, 2012, which is hereby incorporated by reference herein in its entirety.

What is claimed is:

1. An image processing apparatus comprising:
a receiving unit, including a network interface, configured to receive indexed color image data including a color lookup table defining a first color value and a second color value associated respectively with a first reference number and a second reference number, and including a binary bitmap image including pixels, each of the pixels having either one of the first and second reference numbers represented by one bit as a pixel value; and
a processing unit, including at least a processor, configured to generate bitmap image data including a color value per pixel by referring to the color lookup table with respect to reference numbers of pixels of the received indexed color image data pixel by pixel,
wherein, if a composition of a combination of the color values defined by the color lookup table included in the received image data is a specific composition, the processing unit is configured to generate bitmap image data based on the received indexed color image data according to a method which is based on the composition of the combination and skips the referring.

2. The image processing apparatus according to claim 1, wherein the processing unit is configured to perform a halftone process on the generated bitmap image data, and
wherein the processing unit is configured to skip the generation and the halftone process on the basis of the composition of the combination.

3. The image processing apparatus according to claim 1, wherein processing unit is configured to convert the received indexed color image data into another image data having a format that does not include any color lookup table on the basis of the composition of the combination without the generation.

4. The image processing apparatus according to claim 3, wherein, in conversion of the received indexed color image data, the processing unit is configured to convert the received indexed color image data into fill color image data including fill color information, if each of the color values defined by the color lookup table is a minimum color value.

5. The image processing apparatus according to claim 4, wherein the fill color information corresponds to the minimum color value.

6. The image processing apparatus according to claim 4, wherein the minimum color value is 0.

7. The image processing apparatus according to claim 3, wherein, in conversion of the received indexed color image data, the processing unit is configured to convert the received indexed color image data into fill color image data including fill color information, if the combination of the color values is composed of only a maximum color value.

8. The image processing apparatus according to claim 7, wherein the fill color information corresponds to the maximum color value.

9. The image processing apparatus according to claim 7, wherein the maximum color value is 255.

10. The image processing apparatus according to claim 3, wherein, in conversion of the received indexed color image data, the processing unit is configured to convert the received indexed color image data into binary image data not including any color lookup table, if the combination of the color values is composed of a minimum color value and a maximum color value.

11. The image processing apparatus according to claim 10, wherein, in the conversion to the binary image data, the binary image data is associated with an instruction for overwriting the binary image data.

12. The image processing apparatus according to claim 10, wherein the minimum color value is 0 and the maximum color value is 255.

13. An image processing method comprising:
receiving indexed color image data including a color lookup table defining a first color value and a second color value associated respectively with a first reference number and a second reference number, and including a binary bitmap image including pixels, each of the pixels having either one of the first and second reference numbers represented by one bit as a pixel value; and
generating bitmap image data including a color value per pixel by referring to the color lookup table with respect to reference numbers of pixels of the received indexed color image data pixel by pixel, if a composition of a combination of the color values defined by the color lookup table is not a specific composition; and
converting the received indexed color image data into another image data not including any color lookup table without the generation, if the composition of the combination of the color values is the specific composition.

14. The image processing method according to claim 13, wherein the generating is performed by referring to the color lookup table pixel by pixel.

15. The image processing method according to claim 13, further comprising:
performing a halftone process on the generated bitmap image data, if the combination is the first combination, and
wherein a halftone process is not performed on the another image data, if the combination is the second combination.

16. An image processing apparatus comprising:
a receiving unit, including a network interface, configured to receive indexed color image data including a color lookup table defining color values associated respectively with different reference numbers, and including a bitmap image including pixels, each of the pixels having one of the reference numbers per pixel; and
a processing unit, including at least a processor, configured to generate a binary bitmap image by a predetermined method of acquiring reference numbers of the pixels, referring to the color lookup table with respect to the acquired reference numbers to obtain corresponding color values, and performing a halftone process on the obtained corresponding color values, pixel by pixel,
wherein the processing unit is configured to generate a binary bitmap image by another method of converting the received indexed color image data into the binary bitmap image that does not include any color lookup table without the acquiring, the referring, and the performing, if a composition of a combination of the color values defined by the color lookup table is a specific composition.

17. The image processing apparatus according to claim 16, wherein the another method is determined based on the composition of the combination of the color values defined by the color lookup table.

18. The image processing apparatus according to claim 16, wherein, in a conversion by the another method, the processing unit is configured to convert the received indexed color image data into fill color image data including fill color information, if each of the color values defined by the color lookup table is a minimum color value.

19. The image processing apparatus according to claim 18, wherein the fill color information corresponds to the minimum color value.

20. The image processing apparatus according to claim 18, wherein the minimum color value is 0.

21. The image processing apparatus according to claim 16, wherein, in a conversion by the another method, the processing unit is configured to convert the received indexed color image data into fill color image data including fill color information, if the combination of the color values is composed of only a maximum color value.

22. The image processing apparatus according to claim 21, wherein the fill color information corresponds to the maximum color value.

23. The image processing apparatus according to claim 21, wherein the maximum color value is 255.

24. The image processing apparatus according to claim 16, wherein, in a conversion by the another method, the processing unit is configured to convert the received indexed color image data into binary image data not including any color lookup table, if the combination of the color values is composed of a minimum color value and a maximum color value.

25. The image processing apparatus according to claim 24, wherein, in a conversion to the binary image data, the binary image data is associated with an instruction for overwriting the binary image data.

26. The image processing apparatus according to claim 24, wherein the minimum color value is 0 and the maximum color value is 255.

* * * * *